Feb. 17, 1953   W. E. DIEFENDERFER   2,628,688
BLADE RETENTION MEANS WITH INCREASED STIFFNESS
Filed Feb. 8, 1950

INVENTOR
WILLIAM E. DIEFENDERFER
BY Harris G. Luther
ATTORNEY

Patented Feb. 17, 1953

2,628,688

UNITED STATES PATENT OFFICE 2,628,688

BLADE RETENTION MEANS WITH INCREASED STIFFNESS

William E. Diefenderfer, Wethersfield, Conn., assignor to United Aircraft Corporation, East Hartford, Conn., a corporation of Delaware Application February 8, 1950, Serial No. 143,086

11 Claims. (Cl. 170—160.58)

This invention relates to aircraft propellers and more specifically to improved blade retention means for variable pitch propellers.

The advent of high speed and high performance aircraft has influenced the requirements for propeller blades with increased width and consequently there is a commensurate need for an increase in the over-all stiffness characteristics of the blade retention mechanism. Development experience teaches that an important point of flexibility, when considering the entire propeller vibratory system, occurs at the point of blade retention and hence increased stiffening characteristics of the blade retention mechanism is desirable.

It is, therefore, an object of this invention to provide an improved blade retention means for aircraft propellers wherein the desired blade retention stiffness may be provided by use of a roller bearing outboard of the usual blade retaining members, as for example, a multiple row ball bearing stack.

Another object of this invention is to provide a blade retention mechanism of the type described for preloading the roller bearing and thereby positively increasing the stiffening action thereof relative to the blade.

Figure 1:
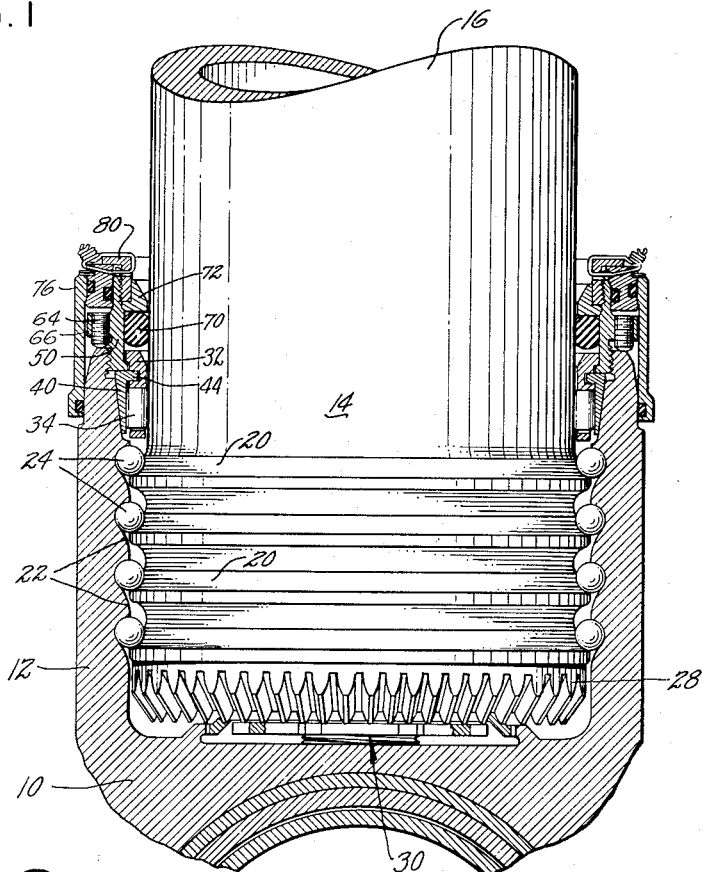

These and other objects will become readily apparent from the following detailed description of the accompanying drawings in which, Fig. 1 is a partial cross sectional view of the blade retention mechanism of this invention with only a broken away portion of the hub being illustrated for convenience.

Figure 2:
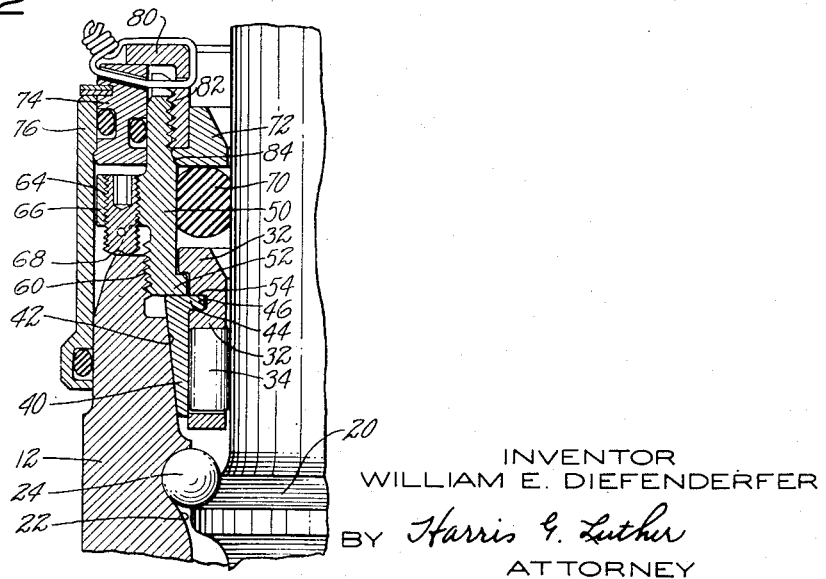

Fig. 2 is an enlarged detailed sectional view of the blade stiffening structure of Fig. 1.

Referring to Fig. 1, a portion of a propeller hub 10 is shown having a blade receiving socket 12 in which the shank end 14 of a propeller blade 16 reposes. The shank 14 has a plurality of peripheral grooves 20 which cooperate with a plurality of recessed grooves 22 on the inner periphery of the socket 12 which grooves form inner and outer races, respectively, for the rows of anti-friction ball bearing units 24.

Although not illustrated herein, means are provided for inserting the ball bearing 24 through the walls of the socket 12 to position them between the sets of grooves 20 and 22. The hub construction for permitting the insertion of the balls 24 is more clearly illustrated for example in Patent No. 2,462,932 issued March 1, 1949, to John E. Anderson.

An integral gear segment 28 is provided at the inboard end of the blade shank 14 which in turn engages a blade interconnecting gear (not shown) for varying the pitch of all of the propeller blades simultaneously. A jack screw mechanism generally indicated at 30 engages the base of the propeller blade and the hub 10 to provide a means for preloading the ball bearings 24 in an outboard direction so that the blade 16 is positively restrained against centrifugal loads under varied operating conditions. A preferred form of jack screw arrangement is illustrated and described in better detail in patent application Serial No. 621,244, filed October 9, 1945, by John E. Anderson and Arthur N. Allen, Jr., for Propellers.

Inasmuch as certain flexural natural frequencies of the propeller blade system may be excited within the operating rotational speed range, and inasmuch as resulting cyclic bending moments may fatigue the blades, hub, and retention, a roller bearing is positioned outboard of the ball bearings 24 and comprises a bearing cage 32 and a plurality of roller bearing anti-friction elements 34 which intimately engage the propeller shank 14 for the purpose of stiffening the retention and thus causing these natural frequencies to be raised to a point where they are not excited in the operating rotational speed range. Inasmuch as certain other cyclic or steady flexural bending moments at the blade retention may be of sufficient magnitude to damage the ball bearing blade retention, the said roller bearing also serves to increase the bending moment capacity of the retention and enable it to carry such transverse bending moments without damage.

As better seen in Fig. 2, a wedge type outer race 40 is provided for the roller bearing elements 34 and has a substantially straight inner surface which engages the elements 34 and a tapered outer surface 42 which engages the hub socket 12. Thus, by imposing a load on the wedge 40 in an inboard direction along the longitudinal axis of the propeller blade, a preloading force may be imposed upon the roller bearings 34 in a direction transversely of said longitudinal axis. To this end the wedge 40 includes a flange 44 a portion of which engages an annular notch 46 in the bearing cage 32. A preloading nut 50 has a lower flange portion 52 engaging the outboard surface of the wedge 40 and also engaging a step portion 54 of the bearing cage 32. In this manner, any adjusting movements of the preload nut 50 along the blade longitudinal axis will cause simultaneous movement of both the wedge 40 and the roller bearing cage 32 whereby a predetermined preloading force will be imposed on the roller bearing 34 transversely of the blade axis. The wedge 40 may be split so as to permit a transverse load to be imposed upon the roller bearing 34. It would also be possible to make the wedge solid but of a material which would distort under load to impose the above-mentioned preload force. Where tolerances are close very little distortion would be required. The preload nut 50 is threaded to the socket 12 at 69 adjacent the outboard extremity of the socket 12. Set screw 64 passes through a rim 66 on the nut 50 and engages the socket 12 at 68 so that the nut 50 will be locked relative to the hub during pitch changing movements of the propeller blade.

An O ring 70 and a seal support ring 72 are positioned outboard of the roller bearing cage 32 between the preloading nut 50 and the blade shank. Another seal ring 74 may be provided adjacent the outer surface of the preload nut 50, as illustrated in Fig. 2, while a closure member 76 forms a surrounding casing for the mechanism just described which closure member is located adjacent the outboard extremity of the blade receiving socket 12.

A retaining nut 80 is threaded at 82 to the preload nut 50 thereby firmly securing the seal support ring 72 against a bevel surface 84 on the inner periphery of the preload nut 50.

It is then apparent that upon adjusting the position of the preload nut 50, as for example by tightening it down against the wedge 40 to a torque of approximately 1000 foot pounds, the engagement of the tapered surface 42 of the wedge 40 against the adjacent surface of the socket 12 will cause a preloading force to be imposed on the roller bearing elements 34 in a direction transversely of the longitudinal axis of the propeller blade. In this manner the propeller blade will be restrained against flexure in this region to effectively increase the stiffness of the propeller blade retention system.

It is therefore apparent that as a result of this invention a simple but extremely effective mechanism has been provided for increasing the stiffness characteristics of the propeller vibratory system in a critical region, i. e., at the point of blade retention.

Although only one embodiment of this invention has been illustrated and described herein, it will be apparent that various modifications and changes may be made in the construction and arrangement of the various parts without departing from the scope of this novel concept.

What it is desired to obtain by Letters Patent is:

1. In a blade retention mechanism for a variable pitch propeller including a hub and a blade receiving socket carried by said hub, a blade having one end thereof positioned in said socket, and means for retaining the blade in said socket comprising, means for retaining said blade against centrifugal loads including a plurality of spaced bearing members surrounding the blade and positioned between the blade and said socket, a row of roller bearings outboard of and spaced from said members, and means imparting pressure transversely of the axis of said roller bearings including a member positioned between the socket and said roller bearings and adjustably movable along the blade axis.

2. In a blade retention mechanism for a variable pitch propeller including a hub and a blade receiving socket carried by said hub, a blade having one end thereof positioned in said socket, and means for retaining the blade in said socket comprising, means for retaining said blade against centrifugal loads including a plurality of spaced bearing members surrounding the blade and positioned between the blade and said socket, a row of roller bearings outboard of and spaced from said members, means imparting pressure transversely of the axis of said roller bearings including mechanism positioned between said socket and said roller bearings, and means for preloading said pressure imparting means including a collar surrounding said blade and engaging said mechanism, said collar being adjustable along the longitudinal axis of the blade.

3. In a blade retention mechanism for a variable pitch propeller including a hub and a blade receiving socket carried by said hub, a blade having one end thereof positioned in said socket, and means for retaining the blade in said socket comprising, means for retaining said blade against centrifugal loads including a plurality of spaced bearing members surrounding the blade and positioned between the blade and said socket, a row of roller bearings outboard of and spaced from said members, and means for imparting a preloading pressure transversely of the axis of said roller bearings including a wedge shaped member between said roller bearings and socket forming the outer race for said roller bearings said last mentioned means including mechanism for positioning said wedge along the longitudinal axis of said blade.

4. In a blade retention mechanism for a variable pitch propeller including a hub and a blade receiving socket carried by said hub, a blade having one end thereof positioned in said socket, and means for retaining the blade in said socket comprising, means for retaining said blade against centrifugal loads including a plurality of spaced bearing members surrounding the blade and positioned between the blade and said socket, and a row of roller bearings outboard of and spaced from said members, means for imparting a preloading pressure transversely of the axis of said roller bearings whereby the blade is restrained against bending movement including a wedge collar member positioned between said roller bearings and said socket, and means operatively engaging said collar member for adjusting the position of said collar member comprising adjustable means movable along the longitudinal axis of said blade and locking mechanism for fixing the adjustment of said adjustable means.

5. A blade retention mechanism according to claim 4 wherein the wedge collar forms the outer race for said roller bearings and intimately engages the inner surface of said socket.

6. In a propeller blade construction having a hub and a blade receiving socket, means for retaining a blade within said socket against centrifugal loads comprising a plurality of annular grooves in said socket and cooperating grooves in said blade, each of said grooves forming outer and inner bearing races, sets of anti-friction bearing members positioned between said outer and inner races, and means for urging said blade in an outboard direction for preloading said anti-friction members, the combination of means for restraining said blade against bending loads comprisig an annular bearing cage surrounding said blade and positioned outboard of said sets of bearing members, anti-friction units carried by said cage between said blade and said socket, means for imparting a preload to said anti-friction units transversely of the longitudinal axis of said blade, and means for simultaneously positioning said cage and load imparting means along said axis to vary the amount of said preloading including lock elements engageable with said socket for fixing the position of said positioning means.

7. In a variable pitch aircraft propeller having a hub and a blade receiving socket, a blade adapted to be subjected to high bending loads during operation having one end thereof positioned in said socket, a multiple row anti-friction bearing stack interposed between said socket and said blade, means engaging said blade and said hub for preloading said stack for restraining said blade against centrifugal loads, bearing means surrounding said blade and positioned outboard of said stack and within the confines of said socket for restraining said blade against bending loads transversely of the longitudinal axis of said blade, and means interposed between said bearing means and said socket for preloading said bearing means transversely of said axis including an element for interlocking said bearing means and socket against relative movement along said axis.

8. In a variable pitch aircraft propeller having a hub and a blade receiving socket, a blade adapted to be subjected to high bending loads during operation having one end positioned in said socket, a multiple row anti-friction bearing stack interposed between said socket and said blade including cooperating recess means for interlocking the latter, means engaging said blade and said hub for preloading said stack for restraining said blade against centrifugal loads, bearing means surrounding said blade and positioned outboard of said stack and within the confines of said socket for restraining said blade against bending loads transversely of the longitudinal axis of said blade, means interposed between said bearing means and said socket for preloading said bearing means transversely of said axis including an element for interlocking the latter against relative movement along said axis, and means for positioning said bearing means along said axis for varying the amount of said preload.

9. In a variable pitch aircraft propeller having a hub and a blade receiving socket, a blade adapted to be subjected to high bending loads during operation and having one end positioned in said socket, a multiple row anti-friction bearing stack interposed between said socket and said blade, means engaging said blade and said hub for preloading said stack for restraining said blade against centrifugal loads, bearing means surrounding said blade and positioned outboard of said stack and within the confines of said socket for restraining said blade against bending loads transversely of the longitudinal axis of said blade comprising a bearing cage and a plurality of roller bearings carried by said cage, means for preloading said bearing means transversely of said axis including an outer race member for said roller bearings having a substantially straight bearing engaging inner surface and an outer tapered surface engaging said socket, and means engaging said outer race member and said cage for adjusting the amount of the preload of said roller bearings including a threaded connection with said socket.

10. In a blade retention mechanism for a variable pitch propeller including a hub and a blade receiving socket, a blade positioned in said socket, mechanism for restraining said blade against centrifugal loads including cooperating means carried by said blade and socket, means located outboard of said restraining mechanism for resisting bending movements of said blade comprising, anti-friction means surrounding and engaging said blade, wedge means interposed between said anti-friction means and said socket and movable means engaging said socket and said wedge means for adjustably positioning said wedge means along the longitudinal axis of said blade.

11. In a blade retention mechanism for a variable pitch propeller including a hub and a blade receiving socket, a blade positioned in said socket, mechanism for restraining said blade against centrifugal loads including cooperating means carried by said blade and socket, means located outboard of said restraining mechanism for resisting bending movements of said blade comprising, anti-friction means surrounding and engaging said blade, and means for preloading said anti-friction means transversely of the longitudinal axis of said blade so that the latter tightly engages said blade including a member located between said anti-friction means and said socket.

WILLIAM E. DIEFENDERFER.

REFERENCES CITED

The following references are of record in the file of this patent:

UNITED STATES PATENTS

| Number | Name | Date |
| --- | --- | --- |
| 1,206,505 | Blume | Nov. 28, 1916 |
| 1,801,511 | Lilley | Apr. 21, 1931 |
| 2,030,953 | Gemeney | Feb. 18, 1936 |
| 2,107,785 | Grabarse et al. | Feb. 8, 1938 |
| 2,269,684 | Potter | Jan. 13, 1942 |
| 2,460,910 | Sheets et al. | Feb. 8, 1949 |
| 2,491,375 | Hardy | Dec. 13, 1949 |
| 2,514,477 | Cushman | July 11, 1950 |